April 5, 1960 J. KASON 2,931,989
DISTRIBUTED AMPLIFIERS
Filed Nov. 30, 1956
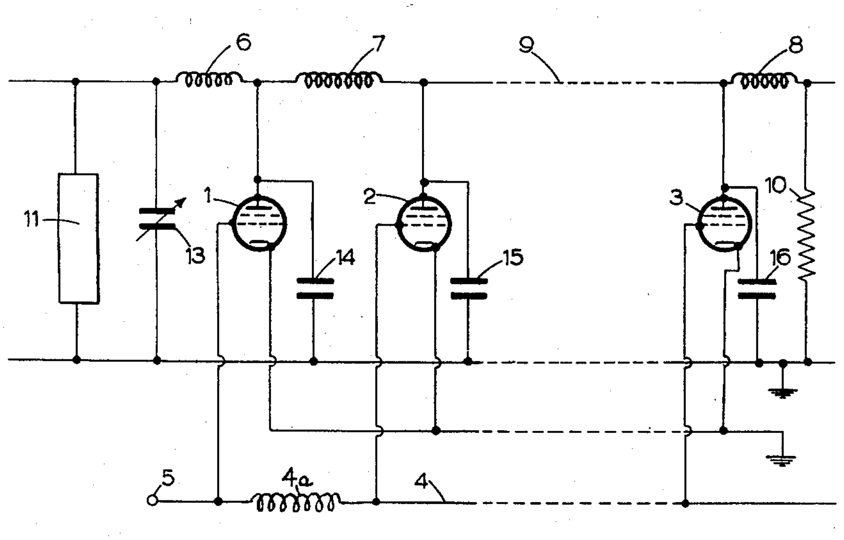
Inventor
J. Kason
By Mason, Downing & Seebold
Attys.

United States Patent Office 2,931,989

Patented Apr. 5, 1960

2,931,989

DISTRIBUTED AMPLIFIERS

John Kason, London, England, assignor to Electric & Musical Industries Limited, Hayes, Middlesex, England, a company of Great Britain Application November 30, 1956, Serial No. 625,294

Claims priority, application Great Britain December 9, 1955

1 Claim. (Cl. 330—54)

This invention relates to distributed amplifiers such as may be used, for example, for the distribution of radio and television programmes to blocks of flats.

Where amplification of several signals, having different frequency bands, is required, distributed amplifiers operating over large frequency bands may be employed. The known distributed amplifiers have, however, the disadvantage of producing approximately constant amplification over a band of frequencies which is considerably larger than that corresponding to the received signals so that noise at interband frequencies is also amplified.

The object of the present invention is to modify a known form of distributed amplifier in such a way that the response of said amplifier is increased in desired frequency bands, relative to the response in intervening frequency bands.

According to the invention there is provided a distributed amplifier for the selective amplification of at least one band of signals in a wider band of input signals, comprising a plurality of amplifying devices, an output electrode line interconnecting the output electrodes of said amplifying devices, a control electrode line interconnecting the control electrodes of said amplifying devices, means for applying said input signals in said wider band to said control electrode line to apply said input signals in succession to the control electrodes of said amplifying devices, the ends of said output electrode and control electrode lines remote from the input ends being unconnected, a matched load terminating said output electrode line at one end, a reactive load terminating said output electrode line at its other end, so that an applied signal fed to said output electrode line is partly directed towards said matched load and substantially absorbed thereby and is partly directed towards said reactive load, substantially reflected thereby, returned along said output electrode line and subsequently substantially absorbed by said matched load, and the length of said output electrode line is chosen to cause said reflected and directly absorbed parts of said signal to be in phase substantially only in said at least one band of signals, thereby effecting said selective amplification.

The anode line of a distributed amplifier normally has a resistive termination at the end remote from the load, which termination absorbs any signal directed theretowards, and so results in a power loss which is equal to the dissipation in the load circuit. In accordance with the said invention this resistive termination is replaced by a reactive termination so that a signal directed towards said reactive termination is fully reflected and directed back along the anode line into the load.

In order that the present invention may be clearly understood and readily carried into effect, the same will be more fully described with reference to the accompanying drawings, the single figure of which illustrates diagrammatically and partly in block form one example of a distributed amplifier in accordance with the said invention.

Referring to the drawings, the distributed amplifier comprises a series of valves connected similarly of which three valves 1, 2 and 3 are shown. The control electrodes of said valves are connected together via series inductances one of which is shown at *4a*, said inductances forming a grid line 4 having at its left-hand end a terminal 5 to which may be applied incoming signals and the cathodes of said valves are connected to ground. The output electrodes are coupled together by inductances such as 6, 7 and 8 forming an anode line 9 which is connected at its right-hand end to a resistive load 10 matched to the impedance of said line, and at its left-hand end to a reactive termination indicated by the rectangle 11. A variable capacitor 13 is connected in parallel with the reactive termination 11, and together with capacitors such as 14, 15 and 16 connected between the output electrodes of said valves and ground forms a control on the delay of the anode line 9.

In operation of the distributed amplifier a signal applied to the grid line 4 via the terminal 5 is fed in succession to the valves, amplified by them, and fed to the anode line 9, where the signal divides, substantially one half travelling towards the right-hand end, and the remainder travelling towards the left-hand end of said line. The portion of the signal travelling towards the right-hand end of the anode line is absorbed by the matched resistive load 10 as in the known forms of distributed amplifiers, but the portion of said signal travelling towards the left-hand end of the anode line is reflected by the reactive termination 11 and sent back along the line to be absorbed also by the resistive load 10. The anode line 9 is, by means of the said inductors and capacitors, made to be of such a length that the reflected portion of the signal is in phase with the portion of the signal originally directed towards the resistive load for all frequencies within the useful bands, so that the response in these bands is substantially double that due to the known forms of distributed amplifier.

What I claim is:

A distributed amplifier for the selective amplification of at least one band of signals in a wider band of input signals, comprising a plurality of amplifying devices, an output electrode line interconnecting the output electrodes of said amplifying devices, a control electrode line interconnecting the control electrodes of said amplifying devices, means for applying said input signals in said wider band to said control electrode line to apply said input signals in succession to the control electrodes of said amplifying devices, the ends of said output electrode and control electrode lines remote from the input ends being unconnected to each other, a matched load terminating said output electrode line at one end, a reactive load terminating said output electrode line at its other end, so that an amplified signal fed to said output electrode line is partly directed towards said matched load and substantially absorbed thereby and is partly directed towards said reactive load, substantially reflected thereby, returned along said output electrode line and subsequently substantially absorbed by said matched load, and the length of said output electrode line is chosen to cause said reflected and directly absorbed parts of said signal to be in phase substantially only in said at least one band of signals, thereby effecting said selective amplification and output connections across the matched termination.

References Cited in the file of this patent

UNITED STATES PATENTS

| | | |
|---|---|---|
| 2,593,948 | Wiegand et al. | Apr. 22, 1952 |
| 2,670,408 | Kelley | Feb. 23, 1954 |
| 2,745,004 | Yeo Pay Yu | May 8, 1956 |
| 2,778,888 | Bradley | Jan. 22, 1957 |